US008872057B2

(12) United States Patent
Krzeminski et al.

(10) Patent No.: US 8,872,057 B2
(45) Date of Patent: Oct. 28, 2014

(54) LIQUID COOLING SYSTEM FOR LINEAR BEAM DEVICE ELECTRODES

(75) Inventors: Paul A. Krzeminski, San Mateo, CA (US); Gordon R. Lavering, Belmont, CA (US)

(73) Assignee: Communications & Power Industries LLC, Palo Alto, CA (US)

( * ) Notice: Subject to any disclaimer, the term of this patent is extended or adjusted under 35 U.S.C. 154(b) by 1521 days.

(21) Appl. No.: 11/376,970

(22) Filed: Mar. 15, 2006

(65) Prior Publication Data

US 2007/0215459 A1 Sep. 20, 2007

(51) Int. Cl.

*B23K 15/00* (2006.01)
*H01J 25/10* (2006.01)
*C25B 15/00* (2006.01)
*H01J 23/033* (2006.01)

(52) U.S. Cl.

CPC .................................... *H01J 23/033* (2013.01)
USPC ............ 219/121.33; 219/121.12; 219/121.21; 219/121.27; 219/121.84; 315/5.39; 315/4; 315/5; 315/5.29; 315/5.32; 204/241

(58) Field of Classification Search

CPC ...................................................... H01J 23/033
USPC ............... 204/241; 315/5.37, 5.38, 5.39, 3–4, 315/5.33, 8.61, 9, 372, 111.81, 5, 5.29, 315/5.32; 219/121.12, 121.21, 121.27, 219/121.84; 313/446, 158, 442; 165/80.2–80.4

See application file for complete search history.

(56) References Cited

U.S. PATENT DOCUMENTS

| | | | | | |
|---|---|---|---|---|---|
| 3,259,790 | A | * | 7/1966 | Goldfinger | 315/5 |
| 3,284,660 | A | * | 11/1966 | Abraham et al. | 315/5.39 |
| 3,305,742 | A | | 2/1967 | McCune | 313/21 |
| 3,359,451 | A | | 12/1967 | Zitelli et al. | 315/5.38 |
| 3,766,051 | A | | 10/1973 | Bollyky | |
| 3,780,336 | A | | 12/1973 | Giebeler | 315/5.38 |
| 3,876,901 | A | * | 4/1975 | James | 315/3.5 |
| 3,886,384 | A | | 5/1975 | Tuinila | 313/39 |
| 4,099,133 | A | * | 7/1978 | Heppinstall | 330/45 |
| 4,405,876 | A | | 9/1983 | Iversen | 313/30 |
| 4,455,504 | A | | 6/1984 | Iversen | 313/30 |
| 4,684,844 | A | | 8/1987 | Iversen | 313/30 |
| 5,329,993 | A | * | 7/1994 | Ettehadieh | 165/104.14 |
| 5,355,093 | A | * | 10/1994 | Treado et al. | 330/45 |
| 5,493,178 | A | | 2/1996 | Byram et al. | 315/5.38 |
| 5,650,751 | A | | 7/1997 | Symons | 330/45 |
| H1758 | H | | 11/1998 | Malouf et al. | 315/5.39 |

(Continued)

OTHER PUBLICATIONS

International Search Report, Application No. PCT/US2007/006551, dated Aug. 21, 2008.

*Primary Examiner* — Dana Ross
*Assistant Examiner* — Ket D Dang
(74) *Attorney, Agent, or Firm* — Nixon Peabody LLP

(57) ABSTRACT

An electrode of an inductive output tube (IOT) is provided with channels for guiding cooling fluid. In one aspect of the invention, the channels are in a confronting relationship with a jacket surrounding the electrode and spaced from the electrode so as to define an interior region. Cooling fluid such as oil is circulated in the channels in fluid communication with the interior region, providing an escape mechanism for trapped bubbles in order to prevent localized heating of the electrode. In another aspect of the invention, the channels form multiple intersecting helical patterns of different pitches, with the steeper-pitched channels providing a more direct escape route for the bubbles.

12 Claims, 5 Drawing Sheets

(56) References Cited

U.S. PATENT DOCUMENTS

| | | | | |
|---|---|---|---|---|
| 5,959,406 | A | 9/1999 | Hart et al. | 315/3.5 |
| 6,147,447 | A | 11/2000 | Beunas et al. | 313/446 |
| 6,429,589 | B2 | 8/2002 | Schult | 315/5.37 |
| 6,601,641 | B1 | 8/2003 | Stefanik et al. | 165/80.4 |
| 6,617,791 | B2 | 9/2003 | Symons | 315/5.38 |
| 2005/0122036 | A1 | 6/2005 | Park et al. | |
| 2007/0060008 | A1 * | 3/2007 | Stokes et al. | 445/39 |

* cited by examiner

LIQUID COOLING SYSTEM FOR LINEAR BEAM DEVICE ELECTRODES

CROSS-REFERENCE TO RELATE APPLICATIONS (Not applicable)

BACKGROUND OF THE INVENTION

1. Field of the Invention

The invention relates to linear beam devices, and more particularly, to a liquid system for electrodes of linear beam devices.

2. Description of the Related Art

Several approaches for cooling an electrode of a linear beam device such as an inductive output tube (IOT) klystron, extended interaction klystron (EIK), coupled cavity traveling wave tube (CCTWT) and traveling wave tubes (TWT), are known. One such approach circulates cooling water around the electrodes. The water removes heat from the electrode, improving efficiency and longevity of the device.

In cases where multiple electrodes are used, such as in a multi-stage depressed electrode (MSDC) device, concerns with arcing between electrodes have led to the development of oil-cooled systems, as the dielectric nature of some oils, unlike water, will repress arcing. Otherwise, the water used has to be de-ionized and issues with corrosion, limited operating temperatures and increased maintenance and operating costs arise.

One issue with oil, which has higher viscosity than water, is bubble formation. Trapped bubbles disrupt oil flow and displace the circulating oil. This results in localized heating at the region of the trapped bubble. Hotspots are thus formed, which, if unmitigated, can lead to catastrophic failure of the device.

There is therefore a long felt need for a liquid cooling system for linear beam device electrodes which addresses the problems associated with trapped bubbles in the fluid flow circuit.

BRIEF SUMMARY OF THE INVENTION

According to one aspect of the invention, a linear beam device in which electrons emitted by a cathode are collected by a collector having one or more electrodes is provided, the linear beam device including a housing having at least one electrode, the electrode having at least one channel provided on the exterior surface thereof for guiding cooling fluid. The linear beam device further includes a jacket disposed within the housing and spaced from the exterior surface of the electrode so as to provide a first, interior region in fluid communication with the channel and defined by the jacket and the exterior surface of the electrode and a second, exterior region defined by the jacket and the housing.

In accordance with another aspect of the invention, there is provided a linear beam device in which electrons emitted by a cathode are collected by a collector having one or more electrodes. The device includes a housing, at least one electrode disposed in the housing; and a plurality of intersecting channels provided on the exterior surface of the electrode for guiding cooling fluid in multiple substantially helical flow paths.

In accordance with another aspect of the invention, there is provided a linear beam device having at least one oil-cooled electrode and at least one water-cooled electrode.

In accordance with another aspect of the invention, there is provided a liquid-cooled electrode assembly for a linear beam device. The assembly includes a housing, a jacket disposed in the housing, and an electrode including at least one channel provided on an exterior surface and having an open side in confronting relationship with an interior region of the jacket. The assembly further includes input and output ports provided in the housing for passage of cooling fluid into and out of the liquid cooled electrode assembly, the cooling fluid flowing in the interior region and the at least one channel to thereby remove heat from the electrode.

In accordance with another aspect of the invention, there is provided a liquid-cooled electrode assembly for a linear beam device. The electrode assembly includes a housing, an electrode, and a plurality of intersecting channels provided on an exterior surface of the electrode for guiding cooling fluid in multiple substantially helical flow paths to thereby remove heat from the electrode.

BRIEF DESCRIPTION OF THE SEVERAL VIEWS OF THE DRAWINGS

Many advantages of the present invention will be apparent to those skilled in the art with a reading of this specification in conjunction with the attached drawings, wherein like reference numerals are applied to like elements, and wherein.

DETAILED DESCRIPTION OF THE INVENTION

Figure 1:
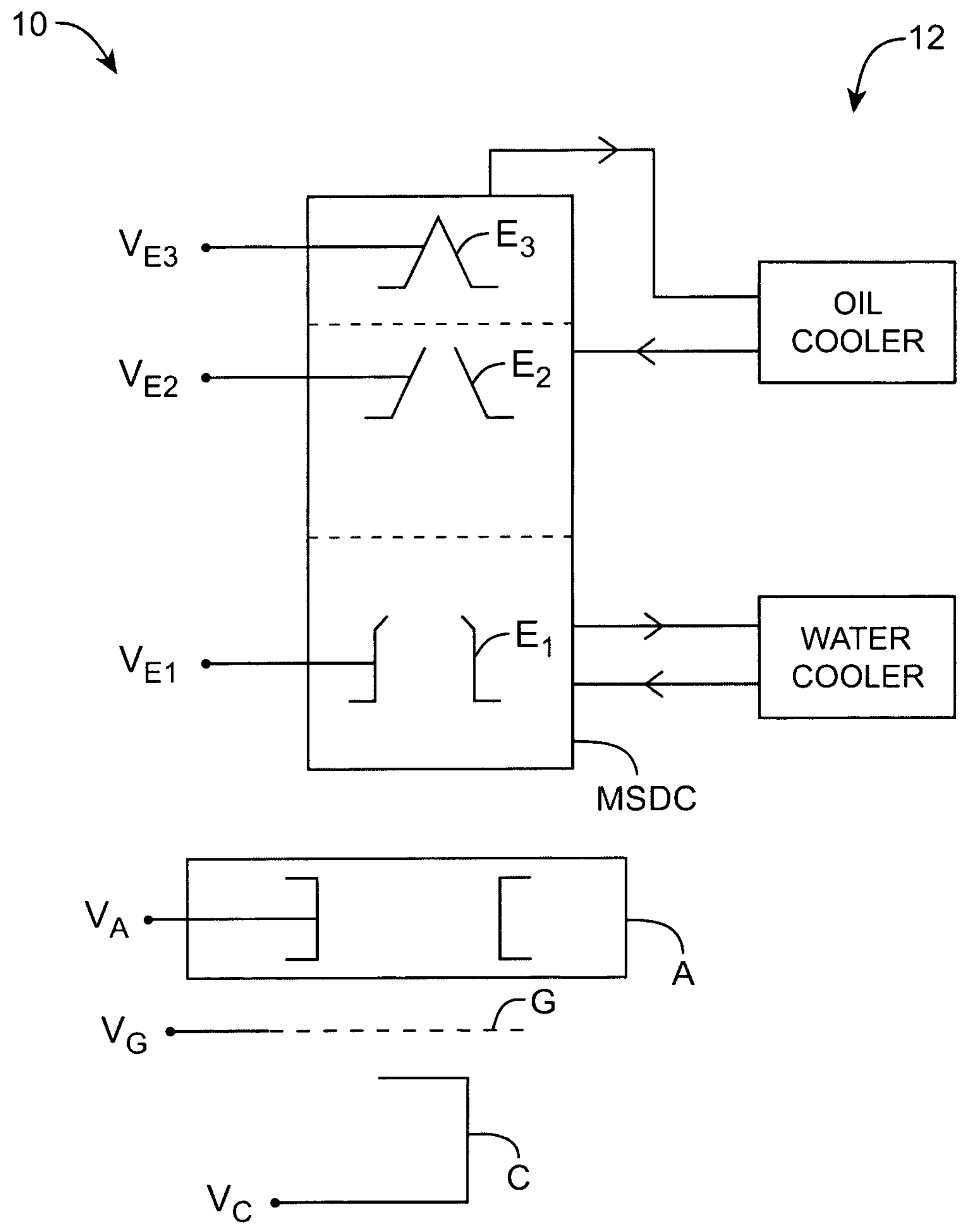
FIG. 1 is a schematic view of an inductive output tube (IOT) having a multi-stage depressed collector (MSDC) and a liquid cooling system in accordance with an aspect of the invention.

FIG. 1 is a schematic view of an inductive output tube (IOT) 10 provided with a cooling system in accordance with the invention. IOT 10 includes a cathode C from which electrons are emitted towards an anode A and collected by a multistage depressed collector MSDC. A grid G is optionally provided. Voltages $V_{E1}$, $V_{E2}$ and $V_{E3}$ are applied respectively to electrodes $E_1$, $E_2$ and $E_3$ of the MSDC. Voltages $V_A$ and $V_C$ and $V_G$ are applied respectively to the anode, cathode and grid. Although illustrated in conjunction with an IOT, the cooling system of the invention is not so limited, and applications with other types of devices, such as klystrons, extended interaction klystrons (EIKs), coupled cavity traveling wave tubes (CCTWTs) and traveling wave tubes (TWTs), are contemplated.

Cooling system 12 is provided to remove heat from the electrodes $E_1$, $E_2$ and $E_3$ of the MSDC. The cooling system consists of a water cooler associated with electrode $E_1$ and an oil cooler associated with electrode $E_2$ and optionally electrode $E_3$. Linear beam devices other than IOTs would have similar cooling devices associated with electrodes thereof.

Figure 2:
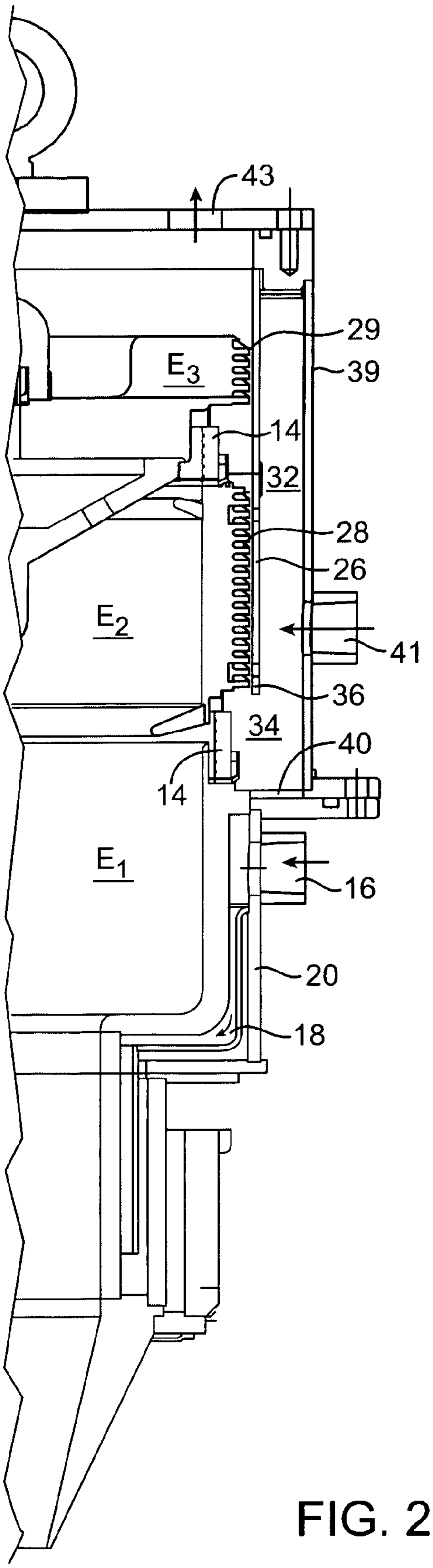
FIG. 2 is a longitudinal cross-sectional view of a portion of an inductive output tube (IOT) in accordance with an aspect of the invention.

FIG. 2 is a longitudinal cross-sectional view of a portion of multi-stage depressed collector MSDC of the inductive output tube IOT 10. Each of electrodes $E_1$, $E_2$ and $E_3$ of the MSDC is electrically isolated from the others such that the electrodes can be biased differently depending on the application. Electrical isolation of the electrodes $E_1$, $E_2$ and $E_3$ is provided by isolators 14, which can be suitable electrically non-conducting materials such as polymers, ceramics, and so forth. In one aspect of the invention, electrode $E_1$ is grounded and electrode $E_3$ is at −34 kV. Electrode $E_2$ is held at about 40-60% potential of $E_3$. The electrodes $E_1$, $E_2$ and $E_3$ are of any conductive material that is suitable for high temperature and vacuum, such as copper, copper-coated or -sputtered aluminum nitride, copper-coated or -sputtered beryllium oxide and the like.

Cooling system 12 (FIG. 1) consists generally of two parts: a water-cooling portion associated with electrode $E_1$ and an oil-cooling portion associated with electrode $E_2$ (and $E_3$). $E_1$ can be cooled by oil as well. Each portion includes a fluid circuit in which cooling fluid is circulated past the associated electrode in heat exchange relationship therewith. The water and oil cooling circuits each includes a fluid (water, water and glycol or oil) reservoir cooler, pump, conduits and other components (not shown). In the case of the water cooled electrode $E_1$, an input port 16 (FIG. 2) is provided, through which cooling water is introduced. The water flows into an annular space 18 surrounding electrode $E_1$ and bounded by a sleeve 20. Such flow removes heat from electrode $E_1$ thereby cooling same. The water then continues to an output port (not shown), through which it exits the MSDC, returning to the water cooler and completing the circuit.

Figure 3:
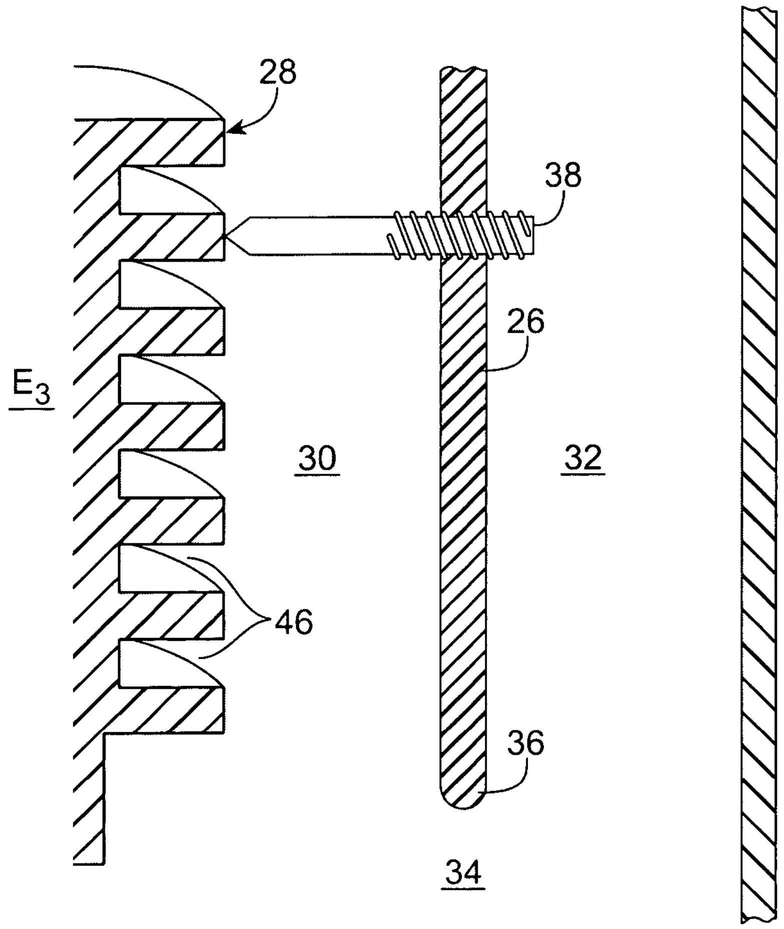
FIG. 3 is a more detailed longitudinal cross-sectional view of a portion of an inductive output tube (IOT) in accordance with an aspect of the invention.

A second oil circuit for cooling electrodes $E_2$ and $E_3$ is also provided. This second portion of the cooling system includes an oil cooler (FIG. 1) for cooling oil which is circulated past the electrodes $E_2$ and $E_3$ for removal of heat therefrom. Electrodes $E_2$ and $E_3$ are substantially cylindrical in shape and surrounded by a jacket 26, also substantially cylindrical. A space shown in detail in FIG. 3 is provided between electrodes $E_2$ and $E_3$ and jacket 26, the space forming an annular interior region 30 of jacket 26 through which oil is circulated in heat exchange relationship with the electrodes $E_2$ and $E_3$. The space is maintained using spacers 38, such as spot face spacers, which threadably engage jacket 26 and pass therethrough to rest against the exterior surface of the electrodes, for example surface 28 of electrode $E_2$. Oil enters interior region 30 from exterior region 32 by way of a gap 34 provided between end portion 36 of jacket 26 and an end wall or seal 40. Oil is introduced into exterior region 32 from the oil cooler by way of input port 41 provided in housing 39. Oil exits the MSDC by way of output port 43.

Figure 4:
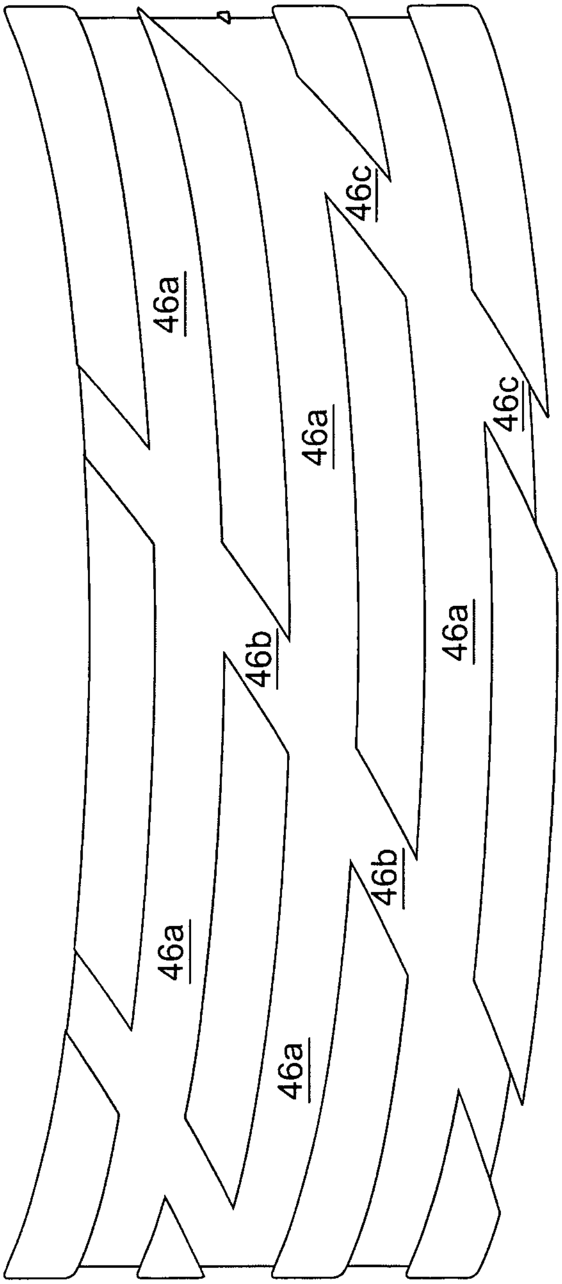
FIG. 4 is an elevational view of an electrode having multiple intersecting and nonintersecting flow channels formed in a exterior side thereof in accordance with the invention.

As detailed in FIGS. 3 and 4, exterior surfaces 28 and 29 of electrodes $E_2$ and $E_3$ are grooved to thereby form channels 46 for passage of oil therein. The channels 46 form helical patterns along the exterior surfaces of the electrodes. Multiple intersecting and/or non-intersecting channels corresponding to different helices having different pitches can be provided, as seen in FIG. 4. Channel **46*a* is helical and is shown as having a shallower pitch than helical channels 46*b* and 46*c*, which are parallel to each other and nonintersecting. Channel 46*a* therefore intersects channels 46*b* and 46*c*. Cooling oil passes through channels 46*a*, 46*b* and 46*c*** on its way past the electrodes $E_2$ and $E_3$ in order to remove heat from the electrodes.

It will be appreciated that since jacket 26 is spaced from exterior surfaces 28 and 29 of electrodes $E_2$ and $E_3$, the channels **46*a*, 46*b* and 46*c* remain open on the side facing interior region 30. Circulating fluid flows past the electrodes $E_2$ and $E_3$ in channels 46*a*, 46*b* and 46*c*, as well as in interior region 30. The distance of jacket 26 from exterior surface 28 of $E_2$ and $E_3$ as controlled by spacers 38 can be varied to control the proportion of cooling oil flowing in the channels 46*a*, 46*b* and 46*c* relative to that flowing in interior region 30, depending on the particular design. One preferred ratio is about 60:40, meaning about 60% of fluid flow is through the channels, and about 40% is through interior region 30**.

An important advantage of the communication of channels **46*a*, 46*b* and 46*c* with interior region 30 is to provide a mechanism to permit escape of bubbles which inevitably form in the oil flow path. Without such communication—that is, if jacket 26 were to abut against exterior surface 28 of the electrodes $E_2$ and $E_3$ to thereby eliminate interior region 30—bubbles would become trapped in the channels 46*a*, 46*b* and 46*c*, displacing cooling oil and inducing localized heating of the surface of the electrodes. The interior region 30** provides an outlet for such bubbles by offering a more resistance-free path to the bubbles, avoiding their entrapment and resultant hotspots. It also enables active flushing of the bubbles should their entrapment be suspected.

The use of multiple intersecting channels also provides a bubble escape mechanism, as the steeper-pitched channels would form a more direct path for the bubbles to travel and/or be flushed out of the MSDC.

Figure 5:
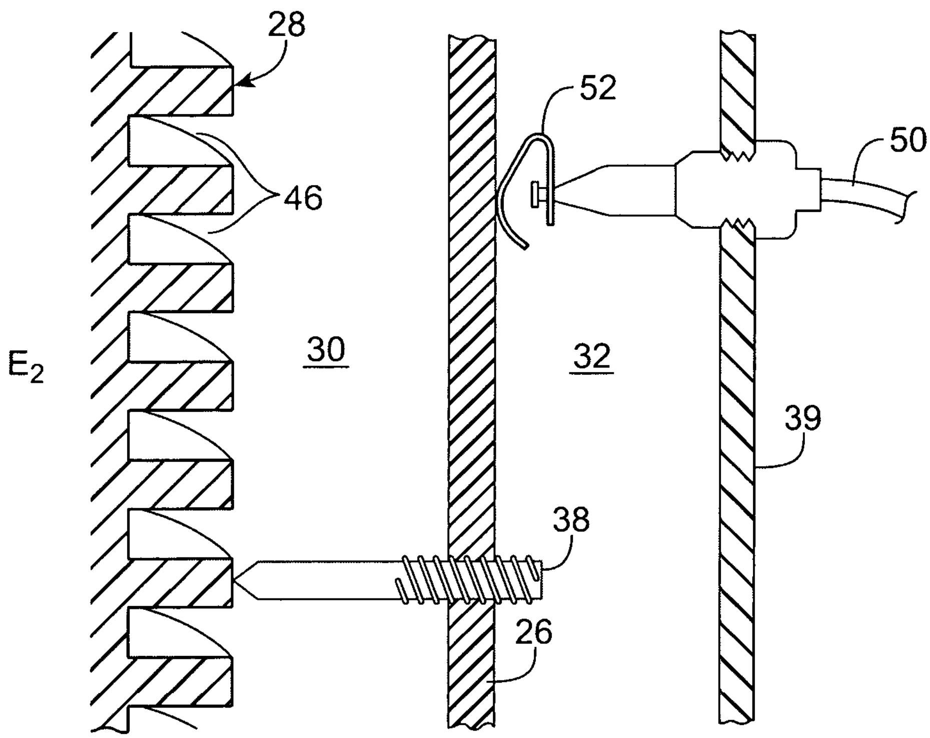
FIG. 5 is a longitudinal cross-sectional view of a portion of an inductive output tube (IOT) showing electrical connections in accordance with an aspect of the invention.

Further, by spacing jacket 26 away from the electrodes $E_2$ and $E_3$, the jacket material can be selected to provide magnetic shielding of the collector and prevent RF leakage. One suitable material for this purpose is steel, although copper and other materials are contemplated. In addition, an electrically conductive material can be used to simplify the contact structure for electrode biasing. With reference to FIG. 5, it can be seen that an electrical path can be established from biasing cable 50 to electrode $E_2$ by way of pin 52, conductive jacket 26 and conductive spacer 38. Of course, if in such an arrangement spacers are required to separate jacket 26 from electrode $E_3$ as well, such spacers would have to be non-conductive in order to maintain electrical isolation of electrodes $E_2$ and $E_3$ from one another. Alternatively, spacers between jacket 26 and $E_3$ can be omitted altogether. Further alternatively, this biasing arrangement can be used to bias electrode $E_3$, in which case and spacers separating jacket 26 from electrode $E_2$ would have to be non-conductive, or omitted altogether.

In accordance with one aspect of the invention the cooling oil used is a dielectric alpha 2 oil. The oil is selected to prevent arcing between the electrodes, particularly differently-biased electrodes $E_2$ and $E_3$ sharing the oil cooling portion of the cooling system 12. In addition, oil has a high breakdown voltage, is more corrosion-resistant, has better operating temperatures, requires less maintenance, and can be used in a more compact arrangement than that for water or air cooling. The above are exemplary modes of carrying out the invention and are not intended to be limiting. It will be apparent to those of ordinary skill in the art that modifications thereto can be made without departure from the spirit and scope of the invention as set forth in the following claims.

The invention claimed is:

1. A linear beam device in which electrons emitted by a cathode are collected by a collector having at least one electrode, the device comprising:

a housing;

a first electrode disposed in the housing, the first electrode having an exterior surface in which a first channel having a longitudinal dimension is formed; and a jacket disposed in the housing, the jacket surrounding the first electrode and spaced from the exterior surface of the first electrode in confronting relationship to the exterior surface of the first electrode such that the jacket does not abut against the exterior surface of the first electrode, wherein the jacket and the first electrode defines a first interior region bounded by the jacket and the exterior surface of the first electrode, the first interior region is configured to be contiguous with the first channel along the longitudinal dimension of the first channel, the jacket and the housing are configured to define a second exterior region bounded by the jacket and the housing, and the first channel, the first interior region and the second exterior region are configured to be in fluid communication with one another.

2. The device of claim 1, further comprising a cooling system having a fluid cooling portion for circulating a first fluid in the channel, the first interior region, and the second exterior region.

3. The device of claim 2, further comprising a second electrode, and the cooling system having a second fluid cooling portion associated with the second electrode.

4. The device of claim 3, wherein a second fluid comprises water.

5. The device of claim 2, wherein the first fluid is a dielectric oil.

6. The device of claim 1, wherein the first channel and the first region provide a 60:40 fluid flow path ratio.

7. A linear beam device in which electrons emitted by a cathode are collected by a collector having one or more electrodes, the device comprising:

a housing;

a first electrode disposed in the housing, the first electrode having an exterior surface;

a jacket disposed in the housing, the jacket surrounding the first electrode and spaced from the exterior surface of the first electrode in confronting relationship to the exterior surface of the first electrode such that the jacket does not abut against the exterior surface of the first electrode; and a plurality of channels provided on the exterior surface of the first electrode, the plurality of channels intersecting at least one intersection point and configured to guide a cooling fluid in multiple substantially helical flow paths that are separate from one another both upstream and downstream of the at least one intersection point.

8. The device of claim 7, further comprising a cooling system having a first fluid cooling portion for a cooling fluid flowing in the channels.

9. The device of claim 8, further comprising a second electrode, and the cooling system having a second fluid cooling portion associated with the second electrode.

10. The device of claim 9, wherein a second fluid comprises water.

11. The device of claim 7, wherein the first cooling fluid is a dielectric oil.

12. The device of claim 1, further including one or more electrically conductive spacers to maintain separation between the jacket and the exterior surface of the first electrode, and to provide an electrical connection for biasing the first electrode.

* * * * *